F. H. REAM.
UNIVERSAL JOINT.
APPLICATION FILED MAY 17, 1919.

1,328,449.

Patented Jan. 20, 1920.

2 SHEETS—SHEET 1.

WITNESS:
A. D. Ellinwood

INVENTOR.
BY Fred H. Ream.
M. C. Gillham.
ATTORNEY.

F. H. REAM.
UNIVERSAL JOINT.
APPLICATION FILED MAY 17, 1919.
1,328,449.
Patented Jan. 20, 1920.
2 SHEETS—SHEET 2.
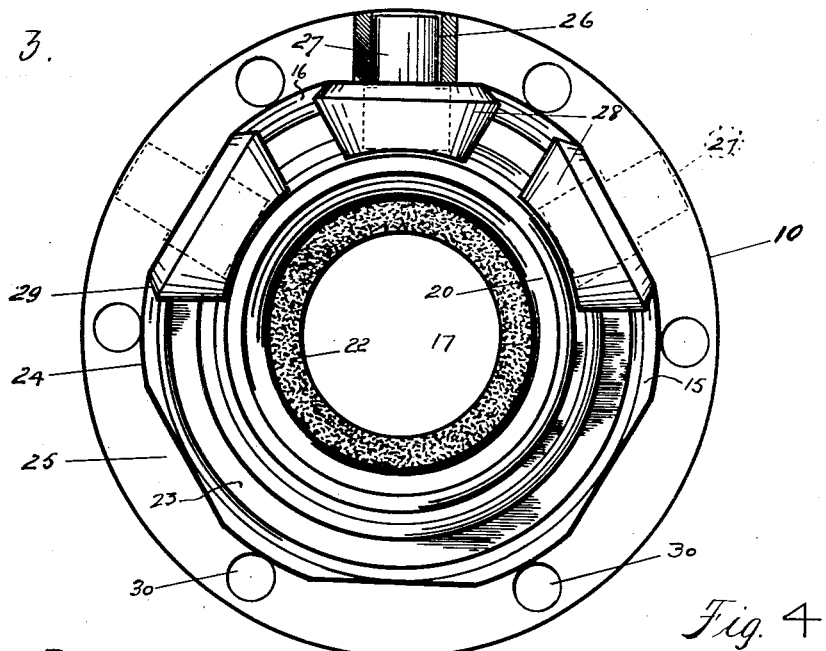
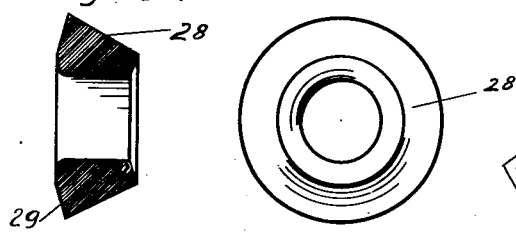
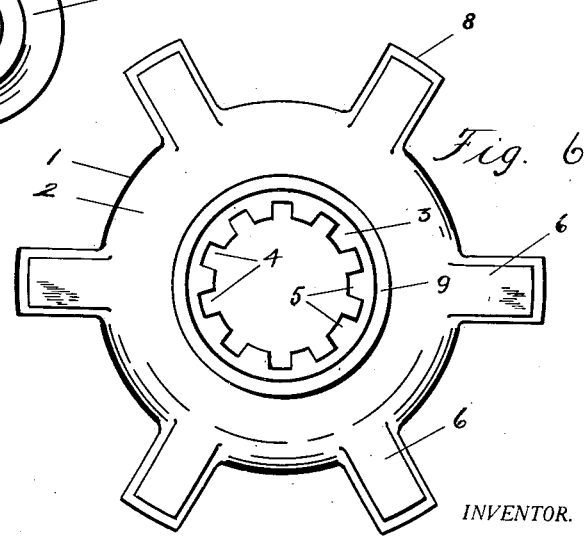
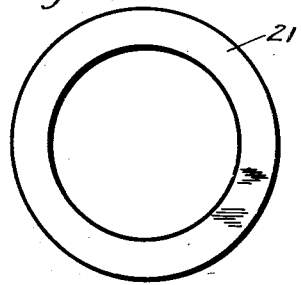
WITNESS:
H. D. Ellinwood
INVENTOR.
BY Fred H. Ream.
M. C. Gillham.
ATTORNEY.

UNITED STATES PATENT OFFICE.

FRED H. REAM, OF KANSAS CITY, MISSOURI.

UNIVERSAL JOINT.

1,328,449.      Specification of Letters Patent.      Patented Jan. 20, 1920.

Application filed May 17, 1919. Serial No. 297,928.

*To all whom it may concern:*

Be it known that I, FRED H. REAM, a citizen of the United States, residing at Kansas City, in the county of Jackson and State of Missouri, have invented a new and useful Improvement in Universal Joints, of which the following is a specification.

My invention relates to improvements in universal joints and particularly to a device of the character described in a former application for Letters Patent by me, Serial No. 277381, filed February 15, 1919, and the object of my invention is to improve and simplify the construction of the joint, first, by the provision of a halved annular housing for the mobile member comprising duplicate half sections having facility for interlocking with each other; second, by providing the respective half sections with one half of the rollers required for coöperating with the mobile member; third, by providing the respective half sections with thrust bearings adapted for receiving the spherical body portion of the mobile member and, fourth, by the provision of facility for storing lubricating substances and means for preventing waste therefrom.

Figure 1:
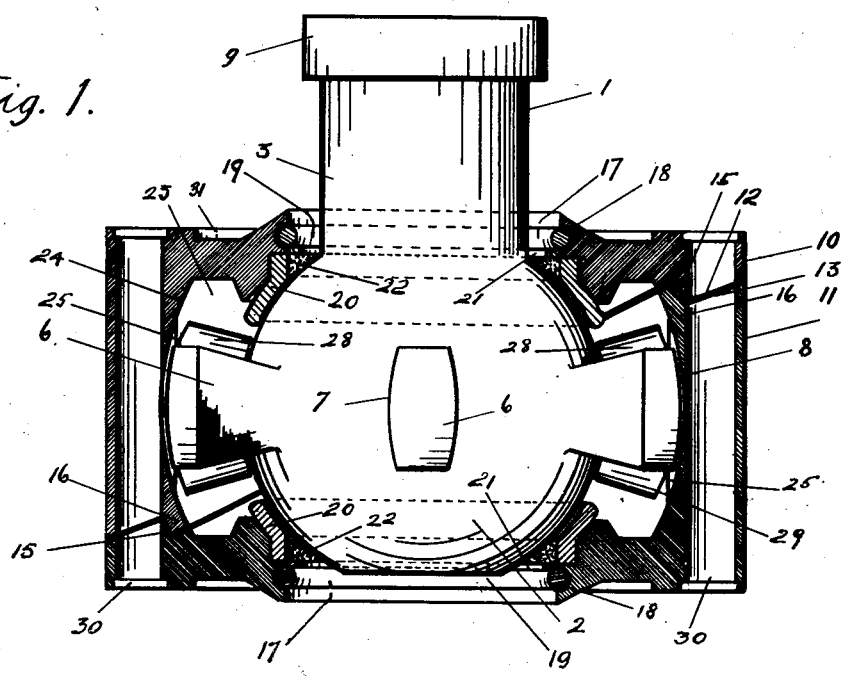
Figure 2:
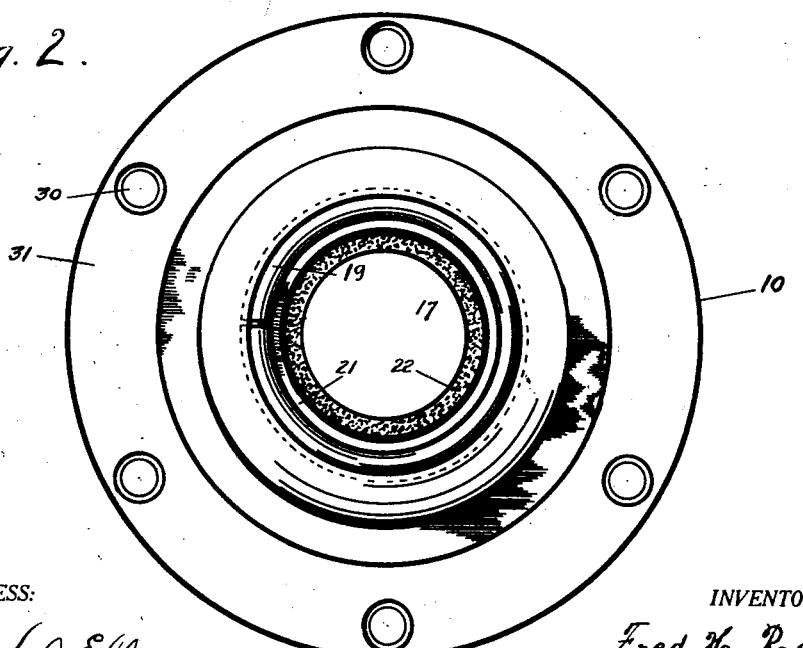

I attain these objects and other advantages by means of the construction and combination of parts illustrated in the accompanying drawing in which Figure 1, is a transverse section of a housing for the mobile member and constructed in accordance with my invention. Fig. 2, is a plan view of the outer side of one half section. Fig. 3, is a plan view of the inner side of one half section, partly sectioned to show the method of mounting the thrust pins and rollers associated therewith. Fig. 4, is a side and also an end view of the thrust pins; Fig. 5, is an end view and also a cross section of one of the rollers associated with the half sections; Fig. 6, is an end view of the mobile member; and Fig. 7, is a plan view of the washer.

Similar numerals of reference refer to corresponding parts throughout the several views.

The numeral 1, designates a mobile member which comprises a cored spherical body portion 2, having a cored stem portion 3, and formed integral therewith. Channels 4, are formed longitudinally in the wall of the core in the mobile member, thereby forming between the channels ribs 5, the channels and ribs are adapted for receiving the spline ends of shafting. Radially projecting cogs 6, are formed integral with and circumferentially of the spherical body portion 2, and at regular intervals, and the sides of the cogs are formed convexed, as shown at 7, in Fig. 1, and their ends are formed concentric with the body portion, as shown at 8, in Figs. 1 and 6. A union coupling 9, is screwed on the end portion of the stem 3 and is adapted for receiving shafting. The mobile member is made of iron, steel, or other suitable metal, preferably of refined steel.

An annular housing is provided for the mobile member and consists of two half sections 10 and 11, which, when operatively assembled, form a housing which is halved on a diagonal line, thereby producing beveled inner sides on the half sections, as is shown at 12 and 13, in Fig. 1. The inner sides of the respective half sections are provided with annular shoulders 15, and annular flanges 16, for interlocking the half sections in operative position. Circular openings 17, are apertured through the central portion of the half sections and are provided with diameters in excess of the diameter of the stem 3 on the mobile member. Annular concaved seats 18, are formed in the walls of the openings and are adapted for receiving split rings 19. A little distance inwardly of the ring seats 18, the walls of the openings are cut away and adapted for receiving annular thrust bearings 20, which are fitted therein by pressure, the space between the inner ends of the bearings and the ring seats is arranged for the reception of washers 21. The inner end portions of the bearings are formed to register with the walls of the openings 17, inwardly to the spherical body of the mobile member and, thereafter, formed concentric therewith. The thrust bearings are preferably made of refined steel and tempered to a suitable hardness to prevent wear. Annular gaskets 22, are arranged on the inner sides of the inner ends of the bearings and bear on the mobile member to prevent escape of grease or lubricating substance from the joint. The gaskets are made of leather, or fabricated material, such as felt, and are held in place by the washers 21, and the washers are held in place by the split rings 19. Outwardly of the bearings the inner sides of the half sections are excavated to form annular cavities 23, adapted for holding lubricating substances when the sections are operatively assembled. The outer walls of the cavity are formed concentric with the spherical body portion of the mobile member, as is shown at 24 in Figs. 1 and 3. Beds 25, are formed on the concentrically formed wall of the cavity 23, at regular intervals circumferentially thereof, and the three beds of the half sections are provided with transverse bores 26, into which thrust pins 27, are fitted by pressure. The inner ends of the pins are enlarged and project inwardly to closely adjacent the spherical body portion of the mobile member. Cone-shaped rollers 28, are revolubly mounted on the projecting ends of the thrust pins, the inner ends of the rollers are formed concentric with the mobile member and their outer ends are formed inwardly flaring, as is shown at 29, in Figs. 1 and 3. Bolt holes 30, are provided at regular intervals in the peripheral margins of the half sections and in line with the ends of the cogs 6, and are adapted for receiving bolts, not shown, to combine the half sections together. An annular seat 31, is formed on the peripheral margin of the outer or plane sides of the half sections for the purpose of receiving coupling flanges usually present on shafting connected with universal joints.

The universal joint is assembled and operated in the following manner: The mobile member is arranged in one of the half sections, so that the spherical body portion thereof shall bear on the thrust bearing 20, associated with the section, the cogs 6, projecting between the rollers 28. The other of the half sections is then inverted and placed on and over the upper side of the mobile member and the flanges 16, interlocked with the shoulders 15, and the bolts secured in the bolt holes 30. The cavity 23, is filled with lubricating material and the gaskets 22, lodged on the ends of the mobile member and in the inner ends of the thrust bearings 20. The washer 21, is then lodged on the gaskets and the split rings 19, imposed on the washers and seated in the annular seats 18. The joint is thus ready for connecting with shafting. When the inverted half section is mounted on the other half section, the same is arranged to pass the rollers associated therewith to and between the unoccupied spaces between the cogs 6, and thereby all the cogs are engaged. If the joint is connected with shafting the cogs 6, are carried on the rollers 28 whenever the mobile member is deflected from straight alinement. The housing constructed and halved in the manner described provides equal distribution of the coacting elements in the duplicate half sections. This novel arrangement reduces the cost of manufacture, reduces the number of parts, and greatly strengthens the joint. It also facilitates quick assembly and easy repair.

Having described my invention what I claim is—

In a universal joint, the combination of a cored mobile member having a spherical body portion provided circumferentially with a series of radially projecting cogs having convexed sides and concentrically formed ends, and a halved annular housing member confining said mobile member, said housing member comprising two interlocking annular half sections divided in a plane oblique to the axis of the joint and provided in their outer sides with annular concentrically formed thrust bearings engaging opposite sides of the spherical body of the mobile member and a series of revoluble cone-shaped rollers imposed between the cogs of the spherical body of the mobile member and having their inner ends formed concentrically with the spherical body and bearing thereon.

Kansas City, Mo., May 13th, 1919.
FRED H. REAM.

Witnesses:
GOODWIN CREASON,
DWIGHT M. SMITH.